Patented Aug. 1, 1950

2,517,468

UNITED STATES PATENT OFFICE 2,517,468

PHENOXYACETAMIDINES

Carl Djerassi, Morristown, and Caesar R. Scholz, Summit, N. J., assignors to Ciba Pharmaceutical Products, Inc., Summit, N. J.

No Drawing. Application May 28, 1948, Serial No. 29,946

6 Claims. (Cl. 260—564)

The present invention relates to new and useful chemical compounds—certain N-unsubstituted phenoxyacetamidines—which are characterized more particularly by their outstanding therapeutic (prolonged stimulating action on the heart) activity.

It has been found that N-unsubstituted phenoxyacetamidines which correspond to the formula

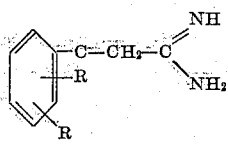

wherein the R's occupy two of the positions 2, 3 and 4, R standing for hydrogen, halogen or methyl, are endowed with outstanding stimulating action on the heart muscle.

These new amidines, in contrast to digitalis preparations, stimulate both the failing and the normal heart. In dogs prepared for the heart-lung technique, the new compounds will restore the heart which has been poisoned by barbiturates and in amounts of 1 milligram or less will negate a toxic dose of barbiturate. Likewise, the new preparations will restore the heart after spontaneous failure and often maintain it for many hours. The restorative activity surpasses that of digitalis markedly because the compounds of the invention will (a) restore the heart repeatedly whereas digitalis is effective usually only once, and (b) the toxic dose exceeds the minimum effective dose by from 50 to 100 times, whereas a dose of digitalis twice the most effective dose poisons the heart irreversibly.

Also, by perfusion of the isolated mammalian heart technique using the cat heart, outstanding heart stimulating action is demonstrated following administration of the novel compounds of the invention. In the table below is recorded the dose administered and the percentage increase in the amplitude of contraction of the heart.

Activity of R-acetamidines

| R | Dose in γ | Percent Increase |
|---|---|---|
| Phenoxy | 5 | 26 |
| | 20 | 59 |
| o-Methyl-phenoxy | 5 | 11 |
| | 20 | 86 |
| m-Methyl-phenoxy | 5 | 36 |
| | 20 | 76 |
| p-Methyl-phenoxy | 5 | 15 |
| | 20 | 64 |
| 3-Methyl-4-chloro-phenoxy | 5 | 28 |
| | 20 | 71 |
| p-Chloro-phenoxy | 5 | 35 |
| 3,4-Dimethyl-phenoxy | 20 | 20 |
| 2,4-Dimethyl-phenoxy | 100 | 28 |

The known closely related thymoxy acetamidine and its N-dibutyl derivative are inactive; the same is true for the N-substituted phenoxy acetamidines. Likewise, we have found the dialkyl-phenoxyacetamidines substituted in other positions of the phenyl ring to be inactive or inhibitory.

The new compounds are obtained by reacting, as a derivative of a phenoxy-acetic acid of the formula

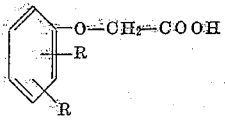

wherein the two R's stand in two of the positions 2, 3, and 4 and represent hydrogen or halogen atoms or methyl groups, an imido ether, thioimido ether, or thioamide not substituted at the nitrogen, with ammonia, or a nitrile with ammonia in the presence of hydrogen sulfide, or a nitrile with sodium amide, or a nitrile with an ammonium salt, if desired in the presence of ammonia, especially with an ammonium salt of thiocyanic acid or of an organic sulfonic acid, for instance of the methane sulfonic acid, hydroxyethane sulfonic acid or para-toluene-sulfonic acid, or by treating with a reducing agent an amidoxime which is not substituted at the nitrogen. The imido ethers and thioimido ethers are preferably reacted in the form of their salts with ammonia, or as free bases with ammonium salts. In the aforementioned reaction which requires the presence of hydrogen sulfide, the latter may as well be formed in the course of the reaction from an agent yielding hydrogen sulfide, such as carbon disulfide, phosphorus pentasulfide, an alkali sulfide, ammonium sulfide, iron sulfide, or aluminum sulfide, if desired in the presence of a small quantity of water. It may be pointed out in this connection than an equimolecular quantity of hydrogen sulfide is not required. The amidoximes are reduced in per se conventional manner, for example, with hydrogen in the presence of Raney nickel.

The reaction conditions may vary with the different starting materials. Thus, the reaction can be carried out in the presence or absence of a diluent and/or a condensing agent at varying degrees of temperature and pressure.

The nitriles are prepared by treating the appropriate phenol with chloroacetonitrile or chloroacetic acid, its esters or amide and converting them by known methods (e. g. dehydration of the amide) to the desired phenoxy-acetonitrile.

The other acid derivatives to be used under the process of the invention can be prepared by the usual methods, for instance from nitriles.

From the amidines formed under the present process salts can be prepared, if they are not directly resultant from the process, as for example, the salts of hydrohalic acids, sulfuric acid, phosphoric acid, nitric acid, aliphatic, alicyclic, aromatic, or araliphatic sulfonic acids, such as methane sulfonic acid, hydroxyethane sulfonic acid, and para-toluene sulfonic acid.

The compounds obtained by the process of the invention can be used as medicaments or as intermediary products.

The examples below disclose in detail how to make the compounds but it is to be understood that they are presented by way of illustration and not limitation. In these examples the same relation exists between parts by weight and parts by volume as exists between grams and cubic centimeters. The indicated temperatures are in degrees centigrade.

Example 1

Phenoxyacetonitrile, prepared by alkylating phenol with chloroacetamide and dehydrating the resulting phenoxy acetamide with phosphorus pentoxide, is converted into the corresponding ethyl imido ether hydrochloride by treatment with equimolar quantities of absolute ethanol and hydrogen chloride in chloroform solution and diluting with ether. The phenoxyacetimido-ethylether hydrochloride melts at 111–113° with gas evolution and remelts at 100°.

Instead of hydrogen chloride, hydrogen bromide may be used, and the ethanol may be replaced by various alcohols, such as methanol, cyclohexanol and the like.

A suspension of 64.6 parts by weight of the above-mentioned imido ether hydrochloride in 130 parts by volume of absolute ethanol is shaken for twenty hours with 74.5 parts by volume of ethanolic ammonia solution containing 5.44 parts by weight of ammonia. A trace of ammonium chloride is removed by filtration and the desired phenoxyacetamidine hydrochloride is isolated by diluting the filtrate with ethyl ether, filtering and recrystallizing from a mixture of methyl ethyl ketone and ethanol; melting point 127–128.5°. The amidine hydrochloride is freely soluble in water.

By using the imido ether hydrobromide the corresponding amidine hydrobromide may be isolated. When the ethyl imido ether is replaced by another ether, such as methyl or cyclohexyl, it is advantageous to use the corresponding alcohol as medium in the conversion to the amidine.

Using 4 - chloro - phenoxy -, 3,4 - dimethyl - phenoxy - or 2,4-dimethyl-phenoxy-imido ether, the corresponding p-chloro-phenoxyacetamidine of melting point 183–185°, 3,4-dimethyl-phenoxy-acetamidine of melting point 202–203.5° and 2,4-dimethyl-phenoxyacetamidine of melting point 176–177° are prepared, respectively.

In lieu of the imido ether hydrochloride to be used according to this example, its free base may be caused to react, e. g. with ammonium chloride or ammonium sulfate or ammonium-para-toluene-sulfate, if desired dissolved in water, to yield the corresponding salt of the amidine.

Example 2

3-methyl-phenoxy-acetonitrile, prepared by treating M-cresol with chloracetonitrile in methyl ethyl ketone solution in the presence of potassium carbonate, is converted with ethyl mercaptan and hydrogen chloride into ethyl-3-methyl-phenoxyaceto-thioimido ether hydrochloride or with ethanol and hydrogen chloride into the ethyl imido ether hydrochloride.

When 73.5 parts by weight of the thioimido-ether or 69 parts by weight of the ethyl imido ether hydrochloride are shaken with 5.44 parts by weight of ammonia in ethanol for twenty to thirty hours, 3-methyl-phenoxyacetamidine hydrochloride is obtained on diluting the reaction mixture with petroleum ether. After recrystallization from a mixture of ether and ethanol, the amidine hydrochloride melts at 179–180.5°.

In similar manner, but replacing m-cresol by o-cresol or p-cresol, there is obtained 2-methyl-phenoxyacetamidine hydrochloride of melting point 147.5–148.5° and 4-methyl-phenoxyacetamidine hydrochloride of melting point 169.5–170.5°, respectively.

4-methyl - phenoxyacetamidine hydrochloride can be obtained also when 4-methyl-phenoxyacetonitrile is treated with an alkali metal amide in liquid ammonia, allowing the ammonia to evaporate, adding methanolic hydrogen chloride solution and recrystallizing the product.

Example 3

3-methyl-4-chloro-phenoxyacetamidine hydrochloride of melting point 193–194° is obtained by either shaking 104 parts by weight of the corresponding imido ether hydrochloride (melting point 119.5–121°) with 7.95 parts by weight of ammonia or by shaking the corresponding thioamide with ethanolic ammonia and removing the hydrogen sulfide with mercuric chloride; the product is purified by recrystallization from absolute ethanol.

The reaction can as well be carried out in the absence of an agent binding hydrogen sulfide.

Example 4

A mixture of 18.9 parts by weight of ammonium-para-toluene-sulfonate and 17.6 parts by weight of 4 - methyl - phenoxyacetonitrile, prepared analogously to the 3-methyl-phenoxyacetonitrile of Example 2, is heated in an oil bath to 240–280° C. for 20 to 30 minutes. When it has cooled off, the reaction mass is boiled with water, some resin is removed, and the solution clarified. On cooling, the 4-methyl-phenoxy-acetamidine-para-toluene - sulfonate which has formed separates in the form of colorless crystals of melting point 201–202° C. With an alkali they yield the free base. With hydrochloric acid, the latter yield a chlorohydrate of melting point 169.5–170.5° C. which is identical with the 4-methyl - phenoxyacetamidine hydrochloride of Example 2.

Instead of ammonium-para-toluene-sulfonate other ammonium salts can be used, such as, for example, ammonium thiocyanate. The reaction can also be performed in the presence of ammonia or of ammonia yielding substances, for example urea.

The same amidine can also be obtained by reducing 4-methyl-phenoxyacetamidoxime, for example, with hydrogen, in the presence of Raney nickel, in alcoholic solution.

Example 5

0.6 part by weight of hydrogen sulfide is introduced, while cooling, into a solution of 14.7 parts by weight of 4-methyl-phenoxyacetonitrile in 55 parts by weight of a solution of ammonia in alcohol which contains 6.8 parts by weight of ammonia. The reaction mass is allowed to stand at room temperature for two or three days under an atmosphere of nitrogen. From the solution coarse crystals of the resultant 4-methyl-phenoxyacetamidine precipitate. They are separated by suction filtering, washed with alcohol and dried at 75° C. under reduced pressure. They melt and decompose at 141–143° C. To convert the substance into the hydrochloride, the base is dissolved, e. g. with a small quantity of alcohol and mixed with the calculated quantity of an alcoholic hydrochloric acid. From the solution, the hydrochloride is precipitated with acetic acid ester or with ether. It is a colorless crystal powder and melts at 169.5–170.5° C.

It is possible to carry out the reaction at an elevated temperature to shorten the reaction period.

This application is a continuation-in-part of our application Serial No. 756,552, filed June 23, 1947, now abandoned.

What we claim is:
1. A phenoxyacetamidine corresponding to the formula

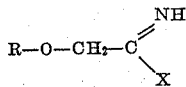

wherein R stands for a member selected from the class consisting of phenoxy, 2-methyl-phenoxy, 3-methyl-phenoxy, 4-methyl-phenoxy, 3-methyl-4-chloro-phenoxy, 4-chloro-phenoxy, 3,4-dimethyl-phenoxy and 2,4-dimethyl-phenoxy groups, and X stands for a member selected from the class consisting of the amino and amine-acid addition salt groups.

2. 3-methyl-phenoxyacetamidine - hydrochloride.
3. 3-methyl-4-chloro - phenoxy - acetamidine-hydrochloride.
4. 2-methyl - phenoxyacetamidine - hydrochloride.
5. Phenoxy-acetamidine-hydrochloride.
6. 4-methyl - phenoxyacetamidine - hydrochloride.

CARL DJERASSI.
CAESAR R. SCHOLZ.

REFERENCES CITED

The following references are of record in the file of this patent:

UNITED STATES PATENTS

| Number | Name | Date |
|---|---|---|
| 2,149,457 | Miescher et al. | Mar. 7, 1939 |
| 2,149,473 | Sonn | Mar. 7, 1939 |

FOREIGN PATENTS

| Number | Country | Date |
|---|---|---|
| 151,972 | Austria | Dec. 27, 1937 |
| 204,760 | Switzerland | Sept. 1, 1939 |
| 204,766 | Switzerland | Sept. 1, 1939 |

OTHER REFERENCES

Djerassi et al., "J. Am. Chem. Soc.," vol. 69 (1947), pages 1689 and 1690.

Certificate of Correction

Patent No. 2,517,468

August 1, 1950

CARL DJERASSI ET AL.

It is hereby certified that error appears in the printed specification of the above numbered patent requiring correction as follows:

Column 2, line 43, for "amidoxines" read *amidoximes*; column 3, line 71, for "M-cresol" read *m-cresol*; column 4, line 52, for "yield" read *yields*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*